United States Patent

Kanai et al.

[11] Patent Number: 5,184,266
[45] Date of Patent: Feb. 2, 1993

[54] METAL-IN-GAP HEAD WITH DOUBLE METAL LAYER

[75] Inventors: Yasushi Kanai; Hiroe Takano, both of Nagaoka; Shushi Saoshita, Toyama; Atsumi Nitta, Nagaoka, all of Japan

[73] Assignee: Alps Electric Co., Ltd., Tokyo, Japan

[21] Appl. No.: 686,733

[22] Filed: Apr. 17, 1991

[30] Foreign Application Priority Data

Apr. 23, 1990 [JP] Japan .................. 2-107143

[51] Int. Cl.$^5$ .......................... G11B 5/235
[52] U.S. Cl. ....................... 360/120; 360/126
[58] Field of Search ............ 360/120, 126; 29/603

[56] References Cited

U.S. PATENT DOCUMENTS 4,742,412 5/1988 Kuriyama ................. 360/119
4,780,779 10/1988 Pisharody et al. ........ 360/126 X
5,038,242 8/1991 Fukushima et al. ........ 360/126

Primary Examiner—John H. Wolff
Attorney, Agent, or Firm—Guy W. Shoup; Patrick T. Bever

[57] ABSTRACT

In a magnetic head of the metal-in-gap type, a magnetic metal layer provided in a magnetic gap comprises a plurality of thin film layers. Of the thin film layers, one which is located on the side of the magnetic gap is formed by use of a material having a comparatively higher saturation magnetic flux density whereas one which is located on the side of facing the magnetic core is formed by use of a material having a comparatively lower saturation magnetic flux density. Magnetic recording efficiency can be thereby enhanced, without a considerable increase in the thickness of the magnetic metal layer provided in the magnetic gap.

4 Claims, 1 Drawing Sheet

METAL-IN-GAP HEAD WITH DOUBLE METAL LAYER

BACKGROUND OF THE INVENTION

This invention relates to a magnetic head of the so-called metal-in-gap type, namely, a magnetic head of the type in which a layer of magnetic metal is provided in the magnetic gap.

DESCRIPTION OF RELATED ART

As a magnetic head for use with fixed disks, there has been known a magnetic head based on the system called the metal-in-gap type, as shown in FIG. 2. In this type of magnetic head, a metal layer 2 comprising a magnetic metal such as an Fe-Al-Si alloy (Sendust), permalloy, amorphous metal, etc. is provided in a thickness of, for instance, 1.5 μm on an opposed end face of one 1a of a pair of magnetic cores 1a and 1b which comprise a ferrite, and a gap layer 3 comprising a nonmagnetic material such as $SiO_2$ is provided to form a magnetic gap between the magnetic metal layer 2 and an opposed end face of the other magnetic core 1b. Such a metal-in-gap type magnetic head has an advantage over general magnetic heads having nothing between opposed end faces of magnetic cores 1a and 1b, in that a stronger and sharper recording field can be obtained. The metal-in-gap most of in the future.

SUMMARY OF THE INVENTION

In the magnetic head of the metal-in-gap type as mentioned above, the magnetic characteristics such as recording field Hx and field gradient $\partial Hx/\partial x$ can be improved by use of a material high in saturation magnetic flux density Bs for the metal layer 2. After the saturation magnetic flux density Bs reaches a certain value, however, the recording field Hx and the field gradient reach respective saturation values, and these values cannot be improved by a further increase in Bs, as has become clear from the results of the present inventors' studies (IEEE Trans. on Magn. MAG-24, pp.2623-2625, Nov. 1988). This seems due to the low saturation magnetic flux density Bs of a ferrite or the like which is used for the magnetic cores.

As an alternative means for accomplishing the same purpose as above, an increase in the film thickness of the metal layer 2 may be contemplated (Refer to the same paper as above). Because the metal layer 2 is provided by forming a metal thin film on an end face of the magnetic core 1a by sputtering, however, an increase in the film thickness leads to an increase in the sputtering time. Thus, this approach has difficulties in manufacture process.

This invention has been made in consideration of the above circumstances, and the object of this invention is to provide a magnetic head of the metal-in-gap type which can be produced with improved recording characteristics and which is free of difficulties in manufacture.

In order to attain the above object, this invention provides a magnetic head of the metal-in-gap type comprising a metal layer in a magnetic gap formed in a magnetic core, the metal layer comprising a magnetic metal, wherein the metal layer comprises a plurality of thin film layers, each of the thin film layers comprised of a material having a saturation magnetic flux density higher than the saturation magnetic flux density of the magnetic core, and the material constituting the thin film layer located nearer to the magnetic gap is higher in saturation magnetic flux density than the material constituting the thin film layer farther from the magnetic gap.

Thus, according to this invention, the metal layer comprises a plurality of thin film layers each of which is comprised of a material having a saturation magnetic flux density higher than the saturation magnetic flux density of the magnetic core, and the material constituting the thin film layer located nearer to the magnetic gap is higher in saturation magnetic flux density than the material constituting the thin film layer farther from the magnetic gap. Therefore, it is possible to obviate the saturation of recording field and of saturation magnetic flux density, which has been occurring in the prior art due to the low saturation magnetic flux density of the magnetic core. Also, it is possible to achieve improved recording field and field gradient, through effective use of the high saturation magnetic flux densities of the thin film layers (particularly, the thin film layer located in the vicinity of the magnetic gap). Further, it is possible to secure satisfactory characteristics without increasing the total thickness of the metal layer, and to obviate the difficulties in manufacture, such as an increased sputtering time.

DESCRIPTION OF THE PREFERRED EMBODIMENT

One preferred embodiment of this invention will now be described below with reference to the drawings.

Figure 1:
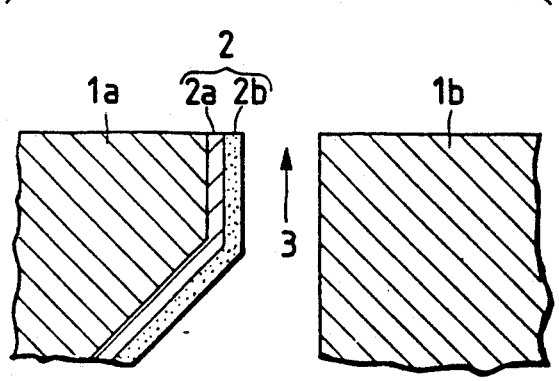
FIG. 1 is a sectional view of a magnetic head according to one embodiment of this invention.
Figure 2:
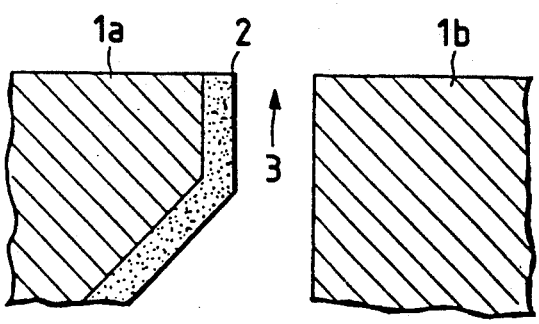
FIG. 2 is a sectional view of a magnetic head according to the prior art.

Referring to FIG. 1, there is shown a magnetic head according to one embodiment of this invention. In the following description of the embodiment of this invention, the components equivalent to those in the prior art mentioned above will be denoted by the same reference characters as used above, and explanation of such components will be omitted.

The difference between the magnetic head of this embodiment and the magnetic head according to the prior art mentioned above lies in the metal layer 2. That is, the metal layer 2 in this embodiment comprises two thin film layers 2a and 2b. The thin film layers 2a and 2b are each formed of magnetic metal. The thin film layer 2a facing a magnetic core 1a is formed of Sendust, for instance, whereas the thin film layer 2b on the side of a magnetic gap 3 is formed of iron, for example. Consequently, the thin film layer 2b on the side of a magnetic gap 3 is higher in saturation magnetic flux density Bs than the thin film layer 2a located farther from the magnetic gap 3.

Now, the operation and effects of this embodiment will be made clear by the results of the present inventors' investigations.

INVESTIGATION EXAMPLE 1

A simulation of magnetic field analysis by the finite element method was carried out, as to the improvement of recording field Hx by providing a two-layer metal film. For the simulation, four kinds of magnetic heads were prepared. The structures of the magnetic heads are set force in Table 1.

TABLE 1

| Head No. | First Layer | Film Thickness [μm] | Saturation Magnetic Flux Density [G] | Permeability |
|---|---|---|---|---|
| 1 | Sendust | 1.50 | 9800 | 3000 |
| 2 | Iron | 0.25 | 22000 | 500 |
| 3 | Sendust | 1.466 | 9800 | 3000 |
| 4 | " | " | 9800 | 3000 |

| Head No. | Second Layer | Film Thickness [μm] | Saturation Magnetic Flux Density [G] | Permeability |
|---|---|---|---|---|
| 1 | — | — | — | — |
| 2 | Sendust | 1.50 | 9800 | 3000 |
| 3 | Iron | 0.284 | 22000 | 500 |
| 4 | Iron | 0.284 | 22000 | 3000 |

The magnetic heads had a gap width Gl of 0.5 μm and a gap depth Gd of 2 μm. The simulation was carried out by passing a current of 0.4 AT and a current of 0.8 AT to each magnetic head and measuring the recording field Hx at the position of a magnetic medium (fixed magnetic disk) spaced from the head by 0.3 μm. The X-axis direction is the moving direction of the magnetic medium. The results of investigation are shown in Table 2.

TABLE 2

| Current [AT] | 1 | 2 | 3 | 4 |
|---|---|---|---|---|
| Recording field [Oe] 0.4 | 2368 | 2375 | 2505 | 2516 |
| 0.8 | 2567 | 2628 | 2834 | 2839 |

As is seen from Table 2, a remarkable improvement of recording field was observed when two thin film layers were provided and the layer exposed to the gap was formed of iron. An improved recording field was obtained also when the layer exposed to the gap was formed of Sendust, as demonstrated by the case of head No. 2. According to the results of other experiments by the present inventors (IEEE Trans. on Magn. MAG-24, pp.2623-2625, Nov. 1988), the improvement achieved with head No. 2 is due to the 0.25 μm increase in the film thickness of the metal film itself as compared to head No. 1, and therefore has no relation to the operation and effects of this embodiment.

INVESTIGATION EXAMPLE 2

By use of a magnetic head of the same kind as in Investigation Example 1 above, the relationship between recording field Hx and field gradient $\partial Hx/\partial x$ was measured. The current was again set at 0.4 AT and at 0.8 AT, as in Investigation Example 1. The results are shown in Table 3.

TABLE 3

| Current [AT] | | 1 | 2 | 3 | 4 |
|---|---|---|---|---|---|
| 0.4 | Recording Field [Oe] | 1806 | 1810 | 1884 | 1889 |
| | Field Gradient [Oe/μm] | 3869 | 3888 | 4212 | 4243 |
| 0.8 | Recording Field [Oe] | 1973 | 2026 | 2112 | 1889 |
| | Field Gradient [Oe/μm] | 3838 | 3925 | 4546 | 4586 |

By the term "recording field" in the table is meant the recording field at which a maximum field gradient is obtained, and by the term "field gradient" is meant the magnetic gradient in that situation (namely, the maximum field gradient). As seen from the table also, a marked improvement of the field gradient was observed only when two thin film layers were provided and the layer exposed to the gap was formed of iron.

As has been described in detail above, according to this invention there is provided a magnetic head of the metal-in-gap type having a metal layer in a magnetic gap formed in a magnetic core, the metal layer comprising a magnetic metal, wherein the metal layer comprises a plurality of thin film layers, each of the thin film layers comprised of a material having a saturation magnetic flux density higher than the saturation magnetic flux density of the magnetic core, and the material constituting the thin film layer located nearer to the magnetic gap is higher in saturation magnetic flux density than the material constituting the thin film layer farther from the magnetic gap. With this structure, it is possible to achieve improved recording field and field gradient. Furthermore, satisfactory characteristics can be secured without increasing the total thickness of the metal layer, and, accordingly, difficulties involved in the manufacture of magnetic heads, such as an increased sputtering time, can be obviated.

What is claimed is:

1. A magnetic head of the metal-in-gap type having a metal layer in a magnetic gap formed in a magnetic core, the metal layer comprising a magnetic metal, wherein the metal layer comprises a plurality of thin film layers, each of the thin film layers comprised of a material having a saturation magnetic flux density higher than the saturation magnetic flux density of the magnetic core, and the material constituting the thin film layer located nearer to the magnetic gap is higher in saturation magnetic flux density than the material constituting the thin film layer farther from the magnetic gap.

2. The magnetic head as set forth in claim 1, wherein the thin film layer nearer to the magnetic gap is comprises of iron, and the thin film layer on the side of facing the magnetic core is comprised of Sendust.

3. The magnetic head as set forth in claim 1, wherein the thickness of the thin film layer on the side of facing the magnetic core is greater than the thin film layer on the side of facing the magnetic gap.

4. The magnetic head as set forth in claim 3, wherein the thickness of the thin film layer on the side facing the magnetic core is about 1.5 μm, and the thickness of the thin film layer on the side of facing the magnetic gap is about 0.2–0.3 μm.

* * * * *